United States Patent
Liang et al.

(10) Patent No.: US 11,977,532 B2
(45) Date of Patent: May 7, 2024

(54) LOG RECORD IDENTIFICATION USING AGGREGATED LOG INDEXES

(71) Applicant: INTERNATIONAL BUSINESS MACHINES CORPORATION, Armonk, NY (US)

(72) Inventors: Ping Liang, Beijing (CN); Xiao Feng Meng, Beijing (CN); Xue Bin Cong, Beijing (CN); Yu He, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 16/836,285

(22) Filed: Mar. 31, 2020

(65) Prior Publication Data

US 2021/0303537 A1 Sep. 30, 2021

(51) Int. Cl.
*G06F 16/22* (2019.01)
*G06F 16/23* (2019.01)

(52) U.S. Cl.
CPC ...... *G06F 16/2272* (2019.01); *G06F 16/2246* (2019.01); *G06F 16/2358* (2019.01)

(58) Field of Classification Search
CPC .......................... G06F 16/2228; G06F 16/2246
See application file for complete search history.

(56) References Cited

U.S. PATENT DOCUMENTS

| | | | |
|---|---|---|---|
| 5,280,611 A | 1/1994 | Mohan | |
| 5,845,278 A * | 12/1998 | Kirsch | G06F 16/951 707/999.005 |
| 7,076,508 B2 | 7/2006 | Bourbannais et al. | |
| 9,043,311 B1 * | 5/2015 | Goo | G06F 16/22 707/715 |
| 9,390,128 B1 * | 7/2016 | Seetala | G06F 16/24524 |
| 9,552,242 B1 | 1/2017 | Leshinsky et al. | |
| 10,990,607 B1 * | 4/2021 | Altman | G06F 16/24556 |
| 2010/0281013 A1 * | 11/2010 | Graefe | G06F 16/2246 707/715 |
| 2016/0019578 A1 | 1/2016 | Sriharsha | |

(Continued)

OTHER PUBLICATIONS

Marchukov, LogDevice: a distributed data store for logs, engineering. fb.com, Aug. 31, 2017 (Year: 2017).*

(Continued)

*Primary Examiner* — Brittany N Allen
(74) *Attorney, Agent, or Firm* — Rakesh Roy; Matthew M. Hulihan; Heslin Rothenberg Farley & Mesiti PC

(57) ABSTRACT

Aggregated log index-based log record identification is provided by maintaining log files of a database system on a plurality log storage devices, the log files including log records of changes to database objects, indexing the log files to obtain a collection of log indexes, where the indexing includes, for each log storage device, indexing log records stored on the log storage device to obtain a respective log index, then based on a request, identifying log storage devices that store log records for servicing the request, the log storage devices storing log indexes, of the collection of log indexes, that index an aggregate set of log records on the log storage devices, obtaining the log indexes from the log storage devices, and aggregating the log indexes to provide an aggregated log index that provides an index of the aggregate set of log records on the log storage devices.

14 Claims, 7 Drawing Sheets

(56) References Cited

U.S. PATENT DOCUMENTS

2017/0004185 A1* 1/2017 Zhu .................... G06F 11/0775
2019/0286726 A1* 9/2019 Labian ................ G06F 16/2272

OTHER PUBLICATIONS

Xinming Lai et al., Research on a Method of Log Aggregation, 2019 IOP Conf. Ser.: Mater. Sci. Eng. 688 033012 (Year: 2019).*

Mell, Peter, et al., "The NIST Definition of Cloud Computing", NIST Special Publication 800-145, Sep. 2011, Gaithersburg, MD, 7 pgs.

"Fast Databases with Fast Durability and Recovery Through Multicore Parallelism", 11th USENIX Symposium on Operating Systems Design and Implementation (OSDI '14), Oct. 8, 2014, pp. 465-477 w/ cvr pg.

* cited by examiner

| Obj | Time | Cl-id |
|---|---|---|
| TS.TB1 | 20190815231101124123 | XXXX |
| TS.TB2 | 20190815231101124234 | XXXX |
| TS.IX1 | 20190815231101124345 | XXXX |
| TS.IX1 | 20190815231101124456 | XXXX |
| TS.IX2 | 20190815231101124567 | XXXX |
| TS.IX1 | 20190815231101124678 | XXXX |

... ... ...

LOG RECORD IDENTIFICATION USING
AGGREGATED LOG INDEXES

BACKGROUND

Many databases support 'recovery' of data to a current state or an earlier state. Table spaces, indexes, index spaces, partitions, data sets, and the entire database are typical examples of a recoverable scope. Such recovery is an aspect in the development of backup and recovery procedures at a given site in order to avoid costly and time-consuming loss of data. Many forms of recovery rely on records that are kept of at least the changes made to the database. So called log records keep a chronological record of any actions/accesses and the time of those actions against the database. A log record is an individual entry in a log file, the individual entry logging information about a given access at a particular time. The logging of records follows a chronological progression in which the timing of sequential actions is increasing along the dimension of time. At any given point in time at which a change is made to the database, there is at most one log record corresponding to that time. Subsequent changes will occur at later time(s). Another characteristic of log records is that they are an irrevocable indication of a change that occurred. Even if a change is later rolled-back, these actions are logged nevertheless; both the change and the rollback are represented in corresponding log records. Meanwhile, this change history is usually not preserved in the database objects actually being modified. For instance, a given record in a table could reflect a first value at time 1 and a second value at time 2 after the record is updated. The first value is typically not preserved elsewhere in the table, yet it will be reflected in the log record pertaining to that database object. This enables, e.g., a recovery of the first value in appropriate situations.

SUMMARY

Shortcomings of the prior art are overcome and additional advantages are provided through the provision of a computer-implemented method. The method maintains log files, of a database system, on log storage devices of the database system. The log files include log records of changes to database objects of a database. The method indexes the log files to obtain a collection of log indexes. The indexing includes, for each log storage device of the log storage devices, indexing log records stored on the log storage device to obtain a respective log index of the log records stored on the log storage device. The method also, based on a request, identifies two or more log storage devices, of the log storage devices, that store log records for servicing the request. The two or more log storage devices store two or more log indexes, of the collection of log indexes, that index an aggregate set of log records on the two or more log storage devices. The method obtains the two or more log indexes from the two or more log storage devices, and aggregates the two or more log indexes to provide an aggregated log index. The aggregated log index provides an index of the aggregate set of log records on the two or more log storage devices.

Further, a computer system is provided that includes a memory and a processor in communication with the memory, wherein the computer system is configured to perform a method. The method maintains log files, of a database system, on log storage devices of the database system. The log files include log records of changes to database objects of a database. The method indexes the log files to obtain a collection of log indexes. The indexing includes, for each log storage device of the log storage devices, indexing log records stored on the log storage device to obtain a respective log index of the log records stored on the log storage device. The method also, based on a request, identifies two or more log storage devices, of the log storage devices, that store log records for servicing the request. The two or more log storage devices store two or more log indexes, of the collection of log indexes, that index an aggregate set of log records on the two or more log storage devices. The method obtains the two or more log indexes from the two or more log storage devices, and aggregates the two or more log indexes to provide an aggregated log index. The aggregated log index provides an index of the aggregate set of log records on the two or more log storage devices.

Yet further, a computer program product including a computer readable storage medium readable by a processing circuit and storing instructions for execution by the processing circuit is provided for performing a method. The method maintains log files, of a database system, on log storage devices of the database system. The log files include log records of changes to database objects of a database. The method indexes the log files to obtain a collection of log indexes. The indexing includes, for each log storage device of the log storage devices, indexing log records stored on the log storage device to obtain a respective log index of the log records stored on the log storage device. The method also, based on a request, identifies two or more log storage devices, of the log storage devices, that store log records for servicing the request. The two or more log storage devices store two or more log indexes, of the collection of log indexes, that index an aggregate set of log records on the two or more log storage devices. The method obtains the two or more log indexes from the two or more log storage devices, and aggregates the two or more log indexes to provide an aggregated log index. The aggregated log index provides an index of the aggregate set of log records on the two or more log storage devices.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
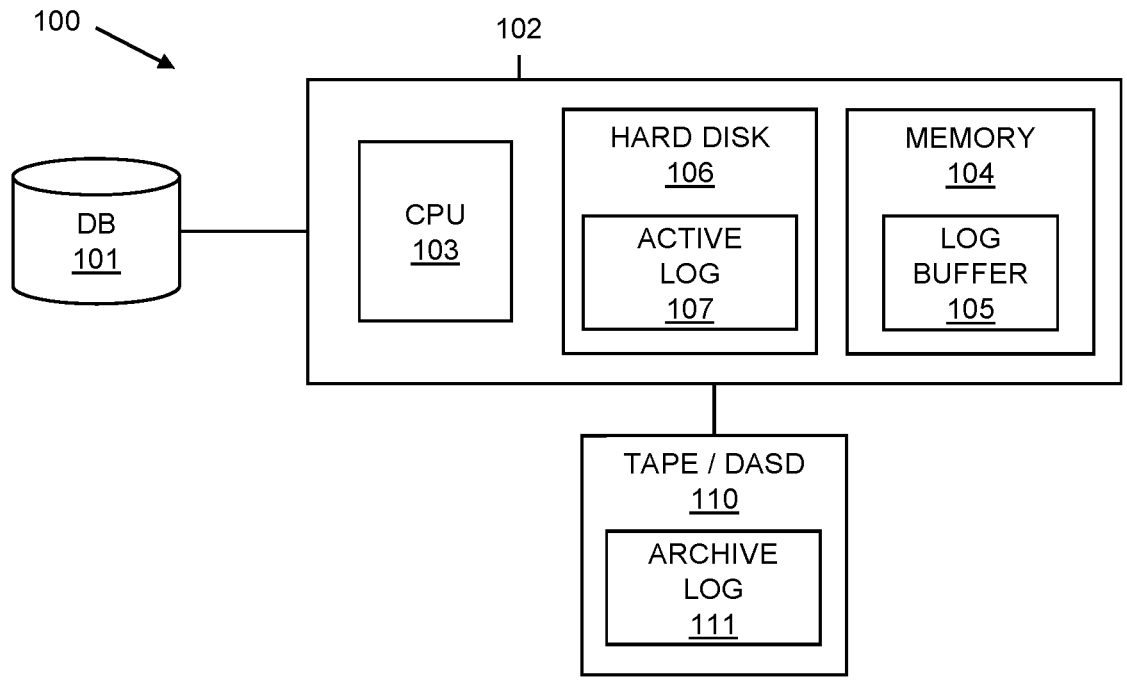
FIG. 1 depicts an example environment to incorporate and use aspects described herein.

Described herein are approaches for log record identification based on aggregated log indexes. Efficiency and speed in the performance of log reading, searching, filtering and mapping, for instance when undertaking a log-based recovery, can be a significant concern when an organization encounters a database failure or other issue that is to be handled by a recovery of database object(s). Additionally, log records possess special characteristics, for instance that they are time-unique and irrevocable, so they are of significant import, and processing them can be a vital aspect of database administration.

The log system for a database system is commonly the most important aspect of the system in terms of implementing data integrity. The log, maintained in files of log records, records all data changes (and potentially others forms of accesses), and often other system-level health status information during database execution. Consequently, the log record corpus can be voluminous for large and/or frequently-accessed databases. To restore database changes, e.g. after a catastrophic event such as database 'abend' (abnormal end), crash, or application failure, the scanning of database logs can be vital to the recovery of the database or portion(s) thereof. The scan process can be time-consuming depending on how many changes are to be recovered and where the log records of interest are located. Often a recovery is scoped based on time, database objects, actions, and/or other parameters such that only a subset of the entire collection of logged changes are of interest. Conventional scanning/searching the log file(s) commences at a chosen beginning point and progresses one record at a time to identify the record(s) of interest. This has the obvious potential to be painstakingly slow and resource-demanding. An enterprise database could suffer severely from this process since access to the objects being recovered may need to be limited or completely shut down until the recovery is finished.

Consequently, expediting the process of log scanning to identify pertinent log records for a recovery effort has advantages. Despite this, conventional efforts to expedite log scanning take the approach of upgrading the logging hardware. A drawback of adding such hardware-based computational resources is the monetary costs, which could be quite high, including the costs to perform the replacement of old equipment with new equipment.

Database administrators can take an image copy ('snapshot') of the database or portions thereof periodically, which can help to reduce the length of the recovery process since the recovery can start from a recovery point of the latest snapshot prior to the desired restore point. A drawback of this is that it places extra effort on the database and the administrators thereof. It also adds a potentially huge additional monetary cost in added storage for holding the image copies, especially when the images are of the entire database system's data. Even with this existing image-copy approach, there could still be a massive amount of log records to scan from a snapshot point to the desired restore point.

Provided herein are approaches for producing a log index on the log files to facilitate expedited search, identification, and access of log records. The log index can be created to index based on the timeline of logged events, the database objects involved in the events, and/or any other data maintained in the log records. Additionally, different indexes based on different such basis types could be produced.

Log recording occurs chronologically, in order of increasing points in time, where no two log records reflect changes occurring at the exactly the same time. Log records are also not modified once committed to the log. For this reason, when log records are indexed as described herein, the index is likely to never change (unless a different indexing approach is desired), and therefore maintenance of the indexes can be straight-forward. Log records also tend to be well-formatted, configured to capture any desired/vital information on which indexing may be performed.

Indexes as described herein facilitate, based on identifying a time range and object(s) pertinent to the recovery, retrieval of targeted database log records, as opposed to performing a full scan of all log records from a given checkpoint. That process of full-scanning can be a time-consuming and processing resource-consuming task. As is described herein, log files of log records are often moved/archived to slower storage/device for archiving and/or post analysis, and aspects can store the indexes of those log files as described herein with the log files on those devices. Example such slower/archival storage devices include hard drives, direct-access storage devices (DASDs), and sequential storage such as tape drives. Consequently, if a database system moves old log records to a slower archive device, the index(es) generated on those log records can be also saved to the archive device in combination with the log records being moved together. Based on the database system recalling old logs, for instance based on a restore request or other type of request, it can attach the archive device to the database system again and retrieve the log index(es) residing therein which index log records on the device. In situations where log records across more than one device, or at least which are indexed by differing indexes, are desired for servicing the request, these indexes can be aggregated/combined together to build an aggregated index ready for scanning to efficiently identify particular log records of interest. This can significantly improve the performance of log scanning, especially for log records that have been moved to a slower archive device.

Conventional databases do not support creating an index of the log records. The particular type of index data structure used in accordance with aspects described herein could be any desired type of index data structure. Example such types include tree structures, such as hierarchical tree structures, such as a B-tree, tables, or the like.

For context, FIG. 1 depicts an example environment to incorporate and use aspects described herein. Environment 100 represents a database system having a database 101 in communication with computer system/controller 102. The computer system 102 includes processor 103, memory 104, and a hard disk 106 which is internal to the system 102. In other examples, the computer system could have multiple processors and/or disk drives. The computer system 102 is also in communication with tape and/or DASD device 110, which is external storage relative to the computer system 102, for archiving log files.

Memory 104, internal hard disk/drive 106, and external drive tape/DASD 110 are example log storage devices, as they store log records. Typically log records are grouped and stored together, for instance in log files. Log files may partition the log records according to some logical scheme, such as where each log file records changes occurring within a given timeframe (an hour, or a day, for instance), or where each log file become full and written out of memory after a given number of log records are written to it.

FIG. 1 also depicts aspects of the logging architecture, including the hierarchical nature of the storage of the log records. As the database is changed, these changed are logged in individual log records in memory 104. The records are stored in a buffer of memory 104. The in-memory buffer is referred to as the log buffer 105 in this example. The fastest log record storage is the log buffer. The log buffer is the first level of the logging. Periodically or aperiodically, log records are written out of the log buffer 105, in the form of log files for instance, to a log structure of hard disk 106, called the active log 107 in this example. The records would then typically be deleted from the log buffer 105 to free up memory space therein. From the active log, the records are periodically or aperiodically written out to the third level of the logging (again to free up storage space), which is the tape/DASD storage 110, specifically an archive log 111 thereof. This is the slowest storage. A three-level logging architecture is very common among commercially available databases, though it is possible to have a logging system with a different number of logging levels.

In this manner, the most recent log records are kept 'nearer' to the database, in memory, for more rapid access if needed. Eventually the records are moved to progressively slower storage, for instance on the assumption that the older the records are, the less likely they will need to be retrieved.

Often times a tape or DASD device will be unmounted when not in use, but will need to be mounted, perhaps after being physically retrieved and loaded, if access thereto is desired. It can be cumbersome to fetch into working memory older log records for processing. Consequently, avoiding unnecessary retrieval of older log records that are not of interest, for instance when performing a restore, can be beneficial.

Accordingly, aspects of a database system maintain log files of the database system on log storage devices thereof. The log files include log records of changes to database objects of a database. "Maintaining" as used in this sense can include creating, building, writing-to, editing, storing, and/or accessing the log files, as examples.

Optimizing the log scanning process can be facilitated in accordance with aspects described herein by creating a distributed mapping system in log devices based on log record identity. For any given log device that houses log records, there can be a corresponding one or more indexes of the log records stored on that device. As noted, the partitioning of log records is typically by creating discrete log files. In some embodiments, each such log file will be indexed to produce an index of that log file, particular an index of the log records of that log file. The indexes can be 'distributed' in that they can be dispersed on the different logging devices (e.g. memory, hard disk, tape) with the files/records they index.

Thus, aspect can create a distributed mapping system linking each logging device piece-by-piece. One or more particular log indexes map to a given log device. In some embodiments, each index is stored on the log device storing the log records that the index indexes. In some embodiments, any given index indexes log records housed on only one device. If the database is to be recovered to some desired point in time, the database system can identify the physical log devices that house the relevant log records within that timeframe. The index(es) from those log devices can be obtained. Then, they can be combined to produce a larger logical index, referred to herein as an aggregated log index. In particular embodiments, the collection of log indexes are stored as a collection of distributed tree data structures, and the aggregated log index is a composite tree data structure assembled from particular tree data structures of that collection of distributed tree data structures, the particular tree data structures being the ones from the log devices that are known to house log records from a given timeframe of interest. Using the aggregated log index, the log records can be scanned efficiently, i.e. by traversing the index to identify particular log records of interest. The index can identify the locations of each of the indexed log records, and therefore indicate the log records deemed pertinent. That enables the scanning facility of the system to directly access into the log file, for instance at a particular storage address, to obtain the actual data of the log record, for instance to inform the particular restore action that is to be performed.

Figure 2:
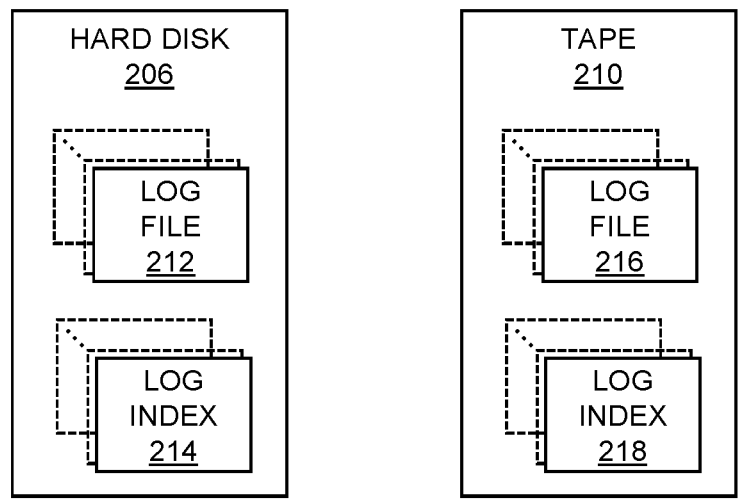
FIG. 2 depicts examples of log storage devices having log index(es) stored thereon, in accordance with aspects described herein.

FIG. 2 depicts examples of log storage devices having log index(s) stored thereon, in accordance with aspects described herein. There may be several physical log storage devices, e.g. more than one memory, more than one hard disk, and/or more than one tape/DASD device. The records on each such device can be indexed by one or more log indexes. FIG. 2 depicts the storing, on each log storage device of the log storage devices, of the log index(s) obtained from the indexing. Thus, hard disk 206 includes log file(s) 212 and corresponding log index(es) 214. Tape 210 includes log file(s) 216 and corresponding log index(es) 218. In some embodiments the log indexes are saved to the individual log devices for portability or other reasons but are also maintained in a faster storage of the database system's computer system for easier, faster access of the indexes, if desired.

Accordingly, aspects include indexing the log files to obtain a collection of log indexes. Pieces of the collection, i.e. individual log indexes, can be distributed across the log devices. The indexing can include, for each log storage device of the log storage devices, indexing log records stored on that log storage device to obtain a respective log index of the log records stored on that log storage device. In some examples where there are multiple log files on a single log device, an index can be created for the log records of each such log file. For a given log record in a given log file stored on a given log storage device indexed by an index of the collection of indexes, the index can identify that one or more of: that given log storage device, that given log file, and a specific location of the given log record in the given log file.

Figures 3, 4:
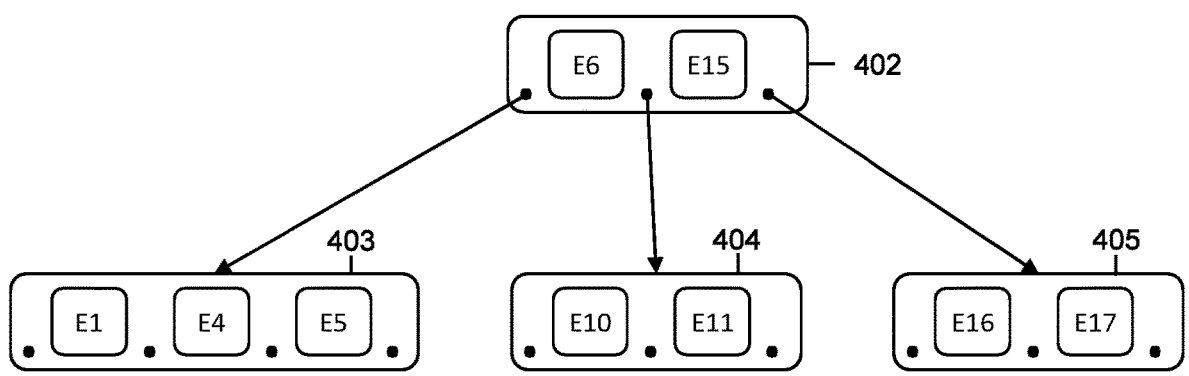
FIG. 3 depicts an example conceptual representation of an index of log records, in accordance with aspects described herein.
FIG. 4 depicts an example hierarchical data structure for indexing log records, in accordance with aspects described herein.

FIG. 3 depicts an example conceptual representation of an index of log records, in accordance with aspects described herein. While the indexes could be built and stored as a table data structure in memory, in example embodiments the indexes are stored as a tree data structure as is explained further below. The conceptual representation of FIG. 3 is presented to illustrate example data maintained in an index.

The table of FIG. 3 shows only seven rows (there may be more), with the top row being a header row. Each row with the exception of the header row corresponds to a given log record in this example. Each such log record corresponds to a given action/access performed against the database. In some examples, the logging and/or indexing are limited to only changes to the database (e.g. creates, inserts, deletes). Each row indicates in this example which database object (Obj) was the target of the action, the time (Time) at which the action occurred, i.e. a timestamp of the action, and location (e.g. address in storage, which may be an absolute address or a relative address) of the log record (Cl-id). Example database objects include objects of varying types, such as tables, indexes, index spaces, partitions, and data sets of the database. The log records may be keyed based on a particular piece of information, such as the database object affected by the action, and therefore a column of the index (e.g. the Obj column) may be representative of such key.

For a given action (represented by a row), following the address in that row leads to the corresponding log record, in which the given action is indicated on the object indicated in the row, and that occurred at the time indicated in the row. The index can provide the location, in the log storage device, from which to read/start reading data of the log record. The log record can store more information than was indexed. The index can enable super-fast searching as compared to a sequential read of the log file.

Referring further to FIG. 3, The objects TS.TB1 and TS.TB2 refer to two database tables, while TS.IX1 and TS.IX2 refer to two database indexes. It is worth nothing in this latter regard that the database here stores indexes as some of its database objects. These indexes which are data objects of the database are not to be confused with the log indexes that index log records of the database.

Indexing the log files can index the log records of changes on any bases, for instance bases that include timing of database changes, object(s) being changed by the changes, object types being changed, and the change types of the changes, as examples.

It should be also noted that while a focus herein is on logged changes to the database and searching for log records pertaining to those changes to the database, aspects described herein could more generally be directed to any actions performed against database objects, including reads and data accesses, rather than just changes per se.

Benefits derived from expedited searching and recovery facilitated by the indexing approach described herein include fast searching for records pertaining to particular selected objects, object types, timeframes, or any other selected parameters that can be identified from data in the log records. In this regard, the indexing can be tailored to capture and index information according to the varying nature and parameterizations of the requests that may be received.

Based on a request, such as a request to restore a database to a given point in time, a process can identify two or more log storage devices, of a plurality of log storage devices of the database system, that store log records for servicing the request. The identified two or more devices may be those that potentially have log records pertinent to the request. The database system can have a knowledge about where the log records covering varying windows of time are stored. If the request is to restore the database from a snapshot taken at a first point in time to a second point in time, the database system can be aware of where the logs are of changes/accesses to the database between the first time and the second time. Accordingly, the identifying the two or more log storage devices can be based on a timeframe of changes to which the request applies. The identified two or more log storage devices can store two or more log indexes, of the collection of log indexes, that index an aggregate set of log records on the two or more log storage devices. The aggregate set of log records refers to the set of log records, across the two of more devices, that are indexed by the two or more indexes. The process can then obtain the two or more log indexes from the two or more log storage devices. In alternative embodiments, the log indexes are already cached or stored elsewhere, and retrieved therefrom regardless of whether the indexes are stored on the individual log devices. These indexes may be accessible apart from any access to the log storage devices in cases where it may be desired to avoid mounting/loading log storage devices merely to access the log indexes therefrom.

In any case, the process can also aggregate the two or more log indexes to provide an aggregated log index. The aggregated log index provides an index of aggregate set of log records on the two or more log storage devices. Any log indexes aggregated together can be indexes for different sets of records (record set A, record set B, etc.). The aggregate log index serves as an index to that collection of records (record sets A+B, etc.). The collection of log indexes can be stored as a collection of distributed tree data structures, where the aggregated log index is a composite tree data structure assembled from those tree data structures of the collection of distributed tree data structures. Thus, the aggregated log index can be essentially a relatively larger tree data structure built from relatively smaller tree data structures.

The process can continue by using the aggregated log index to identify and locate specific log records, of the set of log records, for responding to the request. Specifically, if a request requests a restore of changes occurring within a given scope (within a given timeframe, change to given set of object(s), changes of particular change type(s), etc.), the index can be used to (i) identify which log records fit within that scope, and (ii) provide the addresses to access the data of those log records to actually preform the restore.

An index on log records can index them, for instance in a hierarchical tree form, according to any desired indexing scheme. In one example, the index is a tree that is traversed through two or more levels from root to leaf node, and each leaf node refers to one or more specific log records. Traversal down the tree from a higher level to a lower level could be based on particular parameter(s) of a request and how the individual log records have been logically partitioned to fit into the tree's structure.

FIG. 4 depicts an example hierarchical data structure for indexing log records, in accordance with aspects described herein. The data structure is a B-tree in this example, which is a known type of tree data structure. The tree includes a root node 402, which is a parent node, that has three child nodes 403, 404 and 405. Child nodes 403, 404 and 405 are leaf nodes in this example since they are not parents to any child node(s). It is noted that this example presents a 2-level hierarchy, though in practical examples the structure may have a greater number of levels.

Each node includes (i) element(s), which could each represent a particular log record, or other data, and (ii) reference(s), which may be empty or NULL references. In FIG. 4, root node 402 includes elements E6 and E15 and three references (represented by black dots) pointing to the three child nodes 403, 404, 405 of root note 402. Child node 403 has elements E1, E4 and E5 and empty references represented as black dots between those elements. In examples, the 'elements' in tree nodes are items that can be sorted based on data values or some other scheme. A reference logically presented before or after a given element in one node points to another node, if it exists, that is a child of that one node, and more specifically a root node of a subtree for any elements that appear before or after, as the case may be, the given element in the one node. The reference presented before element E6 of node 402 points to child node 403, which stores elements E1, E4 and E5, which are ordered before E6 in this example. The reference presented after element E6 of node 402 points to child node 404, which stores elements E10 and E11, which are ordered after E6. As noted above, traversal down the tree from a higher level to a lower level could be based on particular parameter(s) of a request and how the individual log records have been logically partitioned to fit into the tree's structure. For instance, assume a request is submitted to restore all changes occurring from time 4 to time 10, inclusive. Assume further that, based on how log records are stored in the log files, the aggregated log index aggregates an index of log records of changes occurring from time 1 to 10 and an index of log records of changes from time 11 to time 20.

In one approach, each of the elements E1, E4, E5, E6, etc. of the nodes in FIG. 4 correspond to specific log records for changes/actions at the enumerated times, i.e. time 1, time 4, time 5, time 6, etc. It is noted that there is likely not a logged item for every instant in time. In the example of FIG. 4, there is no element E2 because there was no action at time 2, for instance.

Any given element can contain a pointer to an address of the log record, in an indicated log storage device, that logs an action performed as the time indicated by the element ID. Thus, root node 402 includes element E6 which points to a log record of an action at time 6. The reference before E6 pointing to child 403 points to a subtree of elements representing actions occurring before time 6. Thus, child node 403 includes elements for logged actions that occurred at times 1, 4 and 5. The corresponding elements E1, E4 and E5 point to log records for those changes at time 1, time 4 and time 5, respectively. The reference after E6 pointing to child 404 points to a subtree of elements representing actions occurring after time 6 but before time 15, as element E15 is present in root node 402. Thus, child node 404 includes elements for any logged actions that occurred between time 6 and time 15. In the example, actions occurred at times 10 and 11, as represented in child node 404 by elements E10 and E11. Finally, element E15 of node 402 points to a log record of an action at time 15 and the reference after E15 points to child 405 points to a subtree of elements representing actions occurring after time 15 and up to time 20. Here, there were actions at time 16 and time 17 as indicated by elements E16 and E17 in child node 405. Using the specific request above that request restore of all changes occurring from time 4 to time 10, searching the index of FIG. 4 would identify log records pointed to by elements E4, E5, E6 and E10. If the index indexes only changes made to the database, rather than accesses/actions on the database generally, then the pointer in each element to these four log records can be followed to directly access the log records containing the changes to be restored. If instead the index is on all accesses to the database (even reads, for instance, which are not items that need to be 'restored'), then either the index could optionally indicate the access type (e.g. read, change, add, etc.) in each element and therefore this could be leveraged to refrain from accessing all logged items between times 4 and 10. In this situation, the searching would follow only the pointed-to log records that indicate changes to the database in the relevant timeframe. Of course, if the index does not indicate the change type, all four records may be accessed directly and then filtering could be performed at that point to identify only the changes to be restored. Either way, efficiencies are gained by using the index as opposed to scanning the log data files sequentially to identify the relevant log records.

In an alternative example, it is only the leaf nodes of the tree that point to specific log records. The leaf nodes could contain elements that represent the key value (e.g. object ID, time, etc.) of indexed log records. Non-leaf nodes could contain elements to facilitate traversing the tree down to the appropriate leaf node(s). E6 and E15 in FIG. 4 could represent a partition of events logged before and after a given time, for instance. Other partitioning schemes not based on times are possible. It may be that, following the tree down level-by-level, the searching identifies more than one child node that each stores one or more elements corresponding to log records that are 'hits' to the received request. The searching could use those elements to index into log file(s) and directly access those log records.

The above are just examples of an indexing approach, but many others are possible. Each node could correspond to a given log storage device. Database object identifier could be a commonly used key on which to index log records. Additionally, there may be more than one key used. A first key could be the particular access type (insert, update, delete, etc.), and object identifier (i.e. of the object to which the was made) could be another key. Additionally or alternatively, the indexing of log records could be repeated on the basis of one or more other index types/approaches. There may be index(es) based on timing of database access, other index(es) based on objects being accessed, and yet other index(es) based on the access types (add, delete, insert) for instance. Each such indexing could produce a respective collection of log indexes. The different log collections could be made available for selection based on the nature of the request. This can enable efficient restoration based on different types of criteria. Furthermore, it may be possible to combine/merge/composite log indexes from one collection with indexes from other log collection(s) such that the aggregated log index is one larger index constructed from indexes built on differing indexing schemes. The searching could search this aggregated index and identify log records fitting the criteria of the restore. Alternatively, if instead multiple collections of log indexes are involved but an aggregated log index for each collection is produced based on the request, then the hits from each aggregated log index could be merged and evaluated to determine which hits satisfy the request.

Accordingly, aspects provide facilities for expediting the database recover log scanning process. This is implemented in some examples by traversing a combined/aggregated log index that was aggregated from a distributed mapping system of log indexes selectively present on the appropriate log storage devices. Log indexes structure based on the uniqueness of log records can help optimize the searching. Potential long outage times of a database system and relevant applications relying thereon can be avoided, which can minimize the business impact. This can be especially important for, e.g., Online Transactional Processing (OLTP) databases. In addition, it can help reduce loss due to system crashes and/or application errors.

Figure 5:
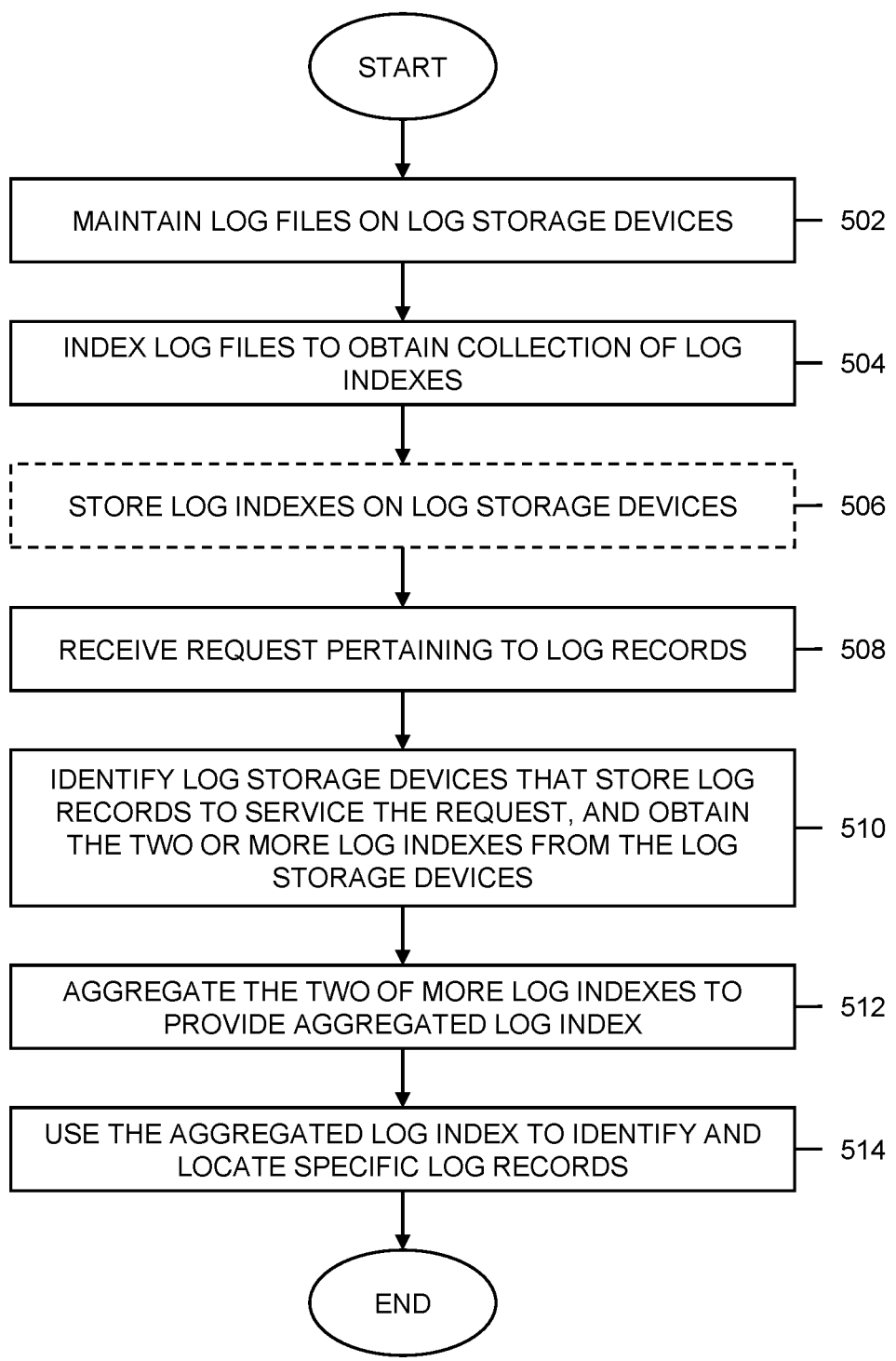
FIG. 5 depicts an example process for aggregated log index-based log record identification, in accordance with aspects described herein.

FIG. 5 depicts an example process for aggregated log index-based log record identification, in accordance with aspects described herein. In some examples, the process is performed by one or more computer systems, such as those described herein, which may include one or more computer systems of or connected to a database system, one or more cloud servers, and/or one or more other computer systems.

The process of FIG. 5 includes [502] maintaining log files, of a database system, on a plurality of log storage devices of the database system. The log files include log records of accesses, for instance changes and/or other types of accesses, to database objects of a database. The plurality of log storage devices can include one or more internal hard drives of a computer system and/or one or more external drives external to the computer system. The one or more external drives can include tape drive(s) and/or direct-access storage device(s), as examples.

The process of FIG. 5 also includes [504] indexing the log files to obtain a collection of log indexes. An example process of the indexing is described below with reference to FIG. 6. The indexing the log files can index the log records of changes on a basis of any desired indexing type, scheme, approach, basis or the like. Examples are selected from (i) timing of database changes, (ii) objects being changed by the changes, and/or (iii) change types of the changes, among other possibilities. For a given log record in a given log file stored on a given log storage device indexed by an index of the collection of indexes, the index identifies the given log storage device, the given log file, and/or a specific location of the given log record in the given log file.

The process of FIG. 5 optionally also includes [506] storing, on each log storage device of the log storage devices, the log index(es) obtained from the indexing of log records on that device.

FIG. 5 continues with, at some point, [508] receiving a request pertaining to log records. The request could be a restore request to restore to an earlier state of the database. Based on a request, the process proceeds by [510] identifying two or more log storage devices, of the plurality of log storage devices, that store log records for servicing the request. The two or more log storage devices can have stored therein two or more log indexes, of the collection of log indexes, that index an aggregate set of log records on the two or more log storage devices. In other words, each log storage device can have stored therein the index(es) that were built and index the respective log records on that device. The log records indexed by those indexes across the storage devices defines the aggregate set of log records, on those device(s), that are indexed. Identification of the two or more log storage devices can be based on, as one example, a timeframe of changes considered by the request, i.e. that are considered to fall within the scope of a timeframe to which the request applies. Based on that timeframe (and/or any other parameters), the particular log storage devices from which to pull the indexes, if not already available from elsewhere, can be identified.

The process [512] obtains the two or more log indexes from the two or more log storage devices and [514] aggregates the two or more log indexes to provide an aggregated log index. The aggregated log index provides an index of the aggregate set of log records on the two or more log storage devices. The process can then use the aggregated log index for servicing the request, e.g. to identify and locate specific log records, of the set of log records, for responding to the request.

The database object(s) include, as examples, tables, indexes, index spaces, partitions, and/or data sets of the database, and the indexing can index log records of changes to the database object(s). The use of the aggregated log index to identify and locate specific log records for responding to the request can therefore search for a subset of those changes to those database object(s).

In some embodiments, the collection of log indexes are stored as a collection of distributed tree data structures, and the aggregated log index is a composite tree data structure assembled from tree data structures of the collection of distributed tree data structures.

Figure 6:
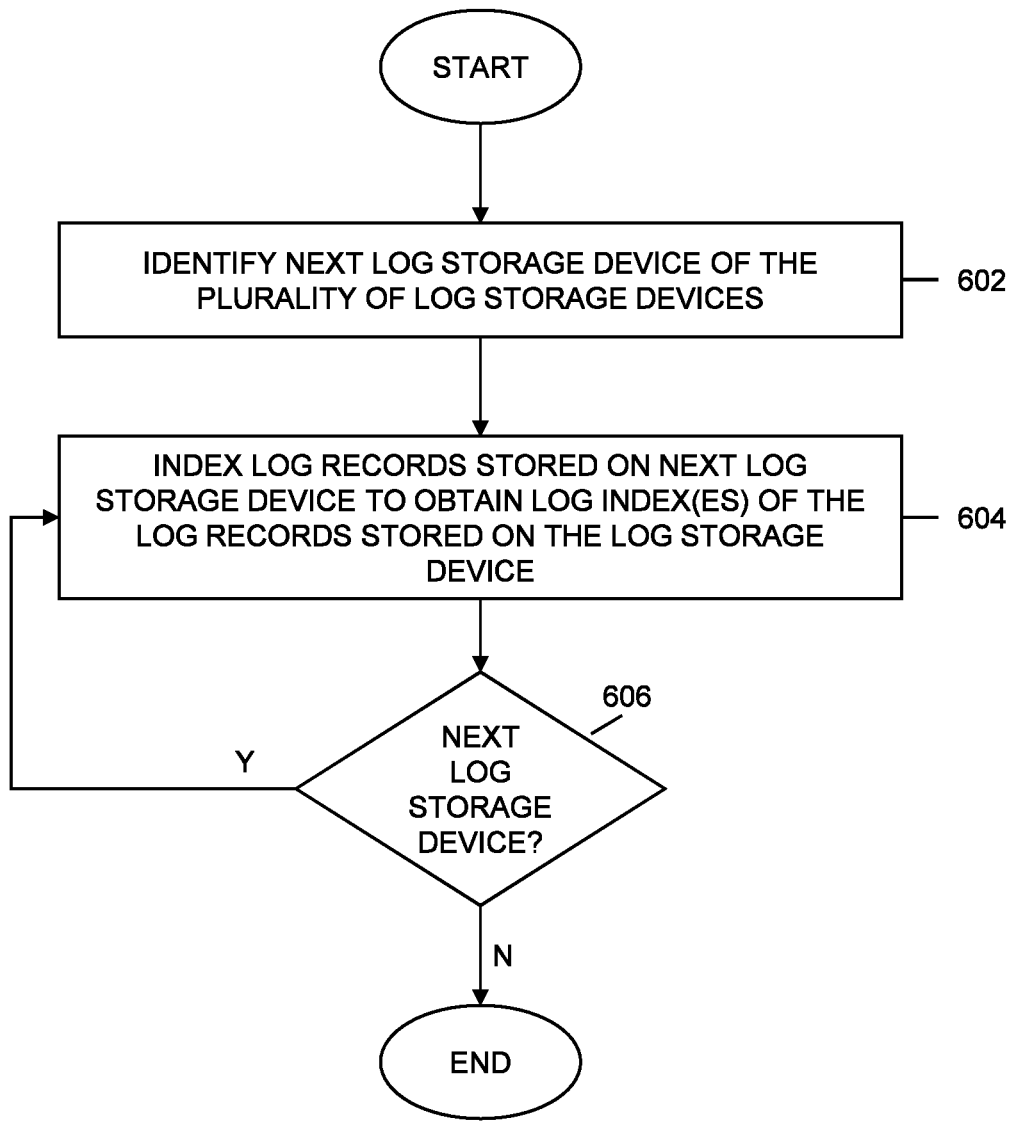
FIG. 6 depicts an example process for indexing log records, in accordance with aspects described herein.

FIG. 6 depicts an example process for indexing log records, in accordance with aspects described herein. In some examples, the process is performed by one or more computer systems, such as those described herein, which may include one or more computer systems of or connected to a database system, one or more cloud servers, and/or one or more other computer systems. The system(s) that perform the process of FIG. 5 could be the same or different from the system(s) that perform the indexing of FIG. 6. Referring to FIG. 6, the indexing process proceeds through one or more log storage devices. The process [602] identifies a next log storage device of the plurality of log storage devices and [604] indexes log records stored on that log storage device to obtain log index(es) of those log records stored on the log storage device. The indexing of log records stored on a log storage device could index all or a proper subset of the log records that are stored on the device. Additionally, in some examples a given log storage device maintains two or more log storage files, and, for each log storage file of the two or more log storage files, the indexing produces a respective log index of log records of that log storage file. The respective log indexes for the two or more log storage files are then included in the overall collection of log indexes.

The process of FIG. 6 proceeds to [606] inquiring whether there is a next log storage device to index. If so, the process iterates by returning to [604]. Otherwise, the process ends. It is noted that any amount of time may pass between 604 and 606, or the process of FIG. 6 could terminate after 604 and be reinitiated when a next log storage device for indexing is identified. As an example, log storage devices may be indexed at specific times, for instance when a set of log files are written to it. Since it may be days or longer before a next set of log files are initially written to a next storage device, the indexing of the log storage devices may be staggered accordingly. In any case, it is therefore seen that, for each log storage device of the plurality of log storage devices, the process indexes log records stored on the log storage device to obtain a respective log index of the log records stored on the log storage device. This may be repeated, for the given device, for more than one set of log records on that device to produce more than one log index on that device.

The collection of log indexes can be a first collection of log indexes, and the indexing can further repeat on a basis of another type of indexing, for instance selected from an indexing based on timing of database changes, objects being changed by the changes, and/or change types of the changes. Repeating the indexing provides a next (e.g. second) collection of log indexes, and the second collection of log indexes can be made available for selection, based on the request, for servicing the request. This can iterate for one or more additional collections of indexes such that any desired number of collections of indexes differing at least by their indexing type (e.g. keys) can be produced.

Although various examples are provided, variations are possible without departing from a spirit of the claimed aspects.

Figure 7:
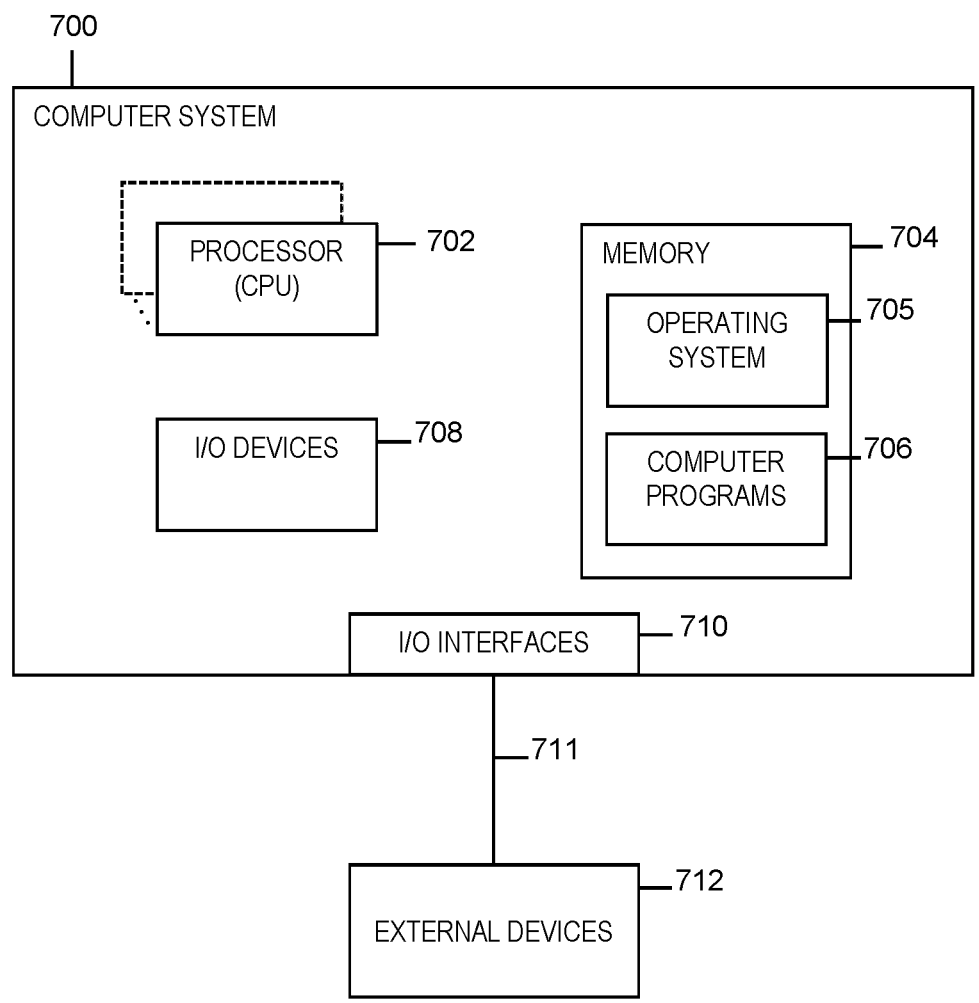
FIG. 7 depicts one example of a computer system and associated devices to incorporate and/or use aspects described herein.

Processes described herein may be performed singly or collectively by one or more computer systems, such as one or more database systems, as an example. FIG. 7 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 7 shows a computer system 700 in communication with external device(s) 712. Computer system 700 includes one or more processor(s) 702, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 702 can also include register(s) to be used by one or more of the functional components. Computer system 700 also includes memory 704, input/output (I/O) devices 708, and I/O interfaces 710, which may be coupled to processor(s) 702 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 704 can be or include main or system memory (e.g. Random Access Memory) used in the execution of program instructions, storage device(s) such as hard drive(s), flash media, or optical media as examples, and/or cache memory, as examples. Memory 704 can include, for instance, a cache, such as a shared cache, which may be coupled to local caches (examples include L1 cache, L2 cache, etc.) of processor(s) 702. Additionally, memory 704 may be or include at least one computer program product having a set (e.g., at least one) of program modules, instructions, code or the like that is/are configured to carry out functions of embodiments described herein when executed by one or more processors.

Memory 704 can store an operating system 705 and other computer programs 706, such as one or more computer programs/applications that execute to perform aspects described herein. Specifically, programs/applications can include computer readable program instructions that may be configured to carry out functions of embodiments of aspects described herein.

Examples of I/O devices 708 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (712) coupled to the computer system through one or more I/O interfaces 710.

Computer system 700 may communicate with one or more external devices 712 via one or more I/O interfaces 710. Example external devices include a keyboard, a pointing device, a display, and/or any other devices that enable a user to interact with computer system 700. Other example external devices include any device that enables computer system 700 to communicate with one or more other computing systems or peripheral devices such as a printer. A network interface/adapter is an example I/O interface that enables computer system 700 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 710 and external devices 712 can occur across wired and/or wireless communications link(s) 711, such as Ethernet-based wired or wireless connections. Example wireless connections include cellular, Wi-Fi, Bluetooth®, proximity-based, near-field, or other types of wireless connections. More generally, communications link(s) 711 may be any appropriate wireless and/or wired communication link(s) for communicating data.

Particular external device(s) 712 may include one or more data storage devices, which may store one or more programs, one or more computer readable program instructions, and/or data, etc. Computer system 700 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 700 may be operational with numerous other general purpose or special purpose computing system environments or configurations. Computer system 700 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
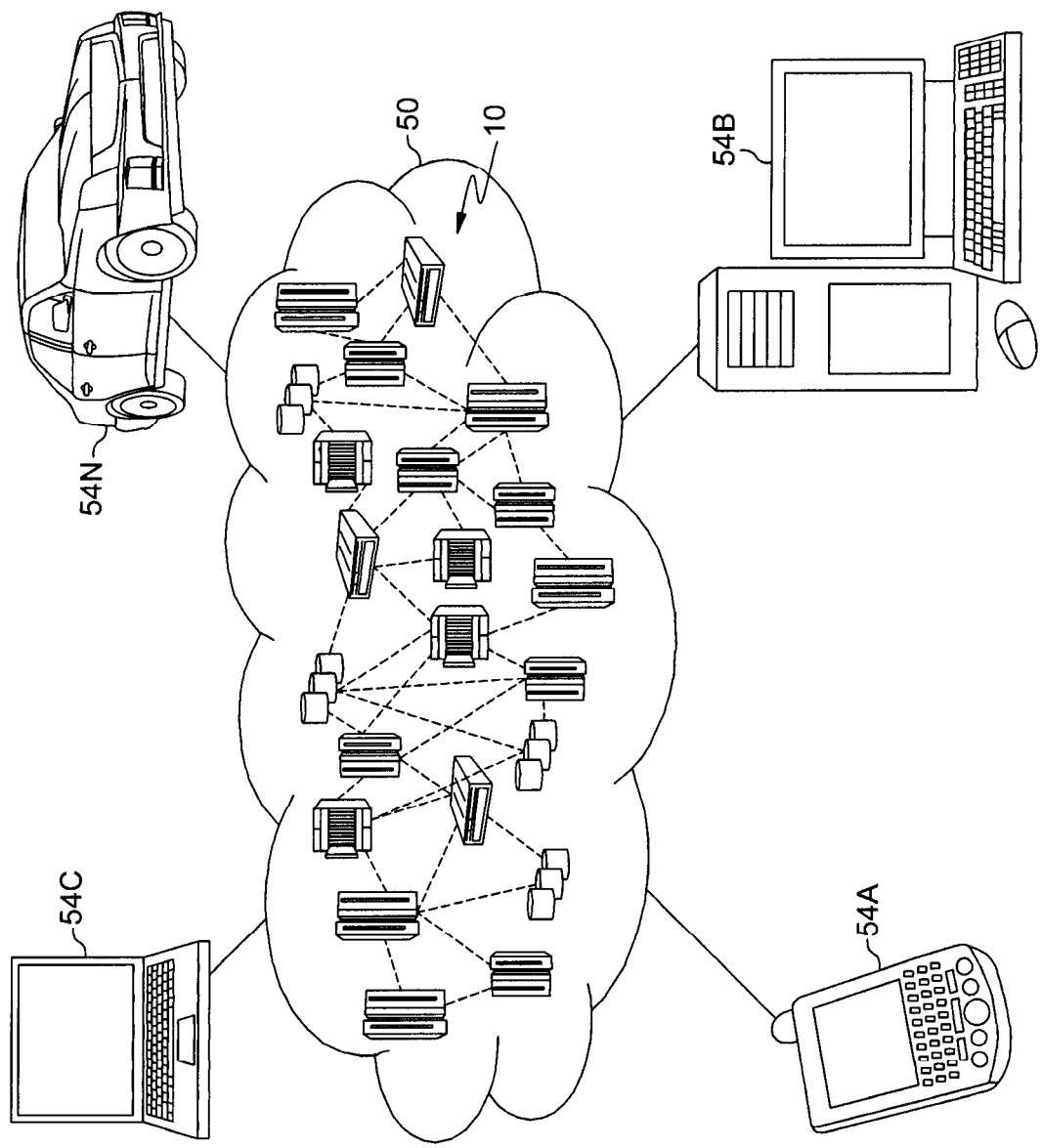
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
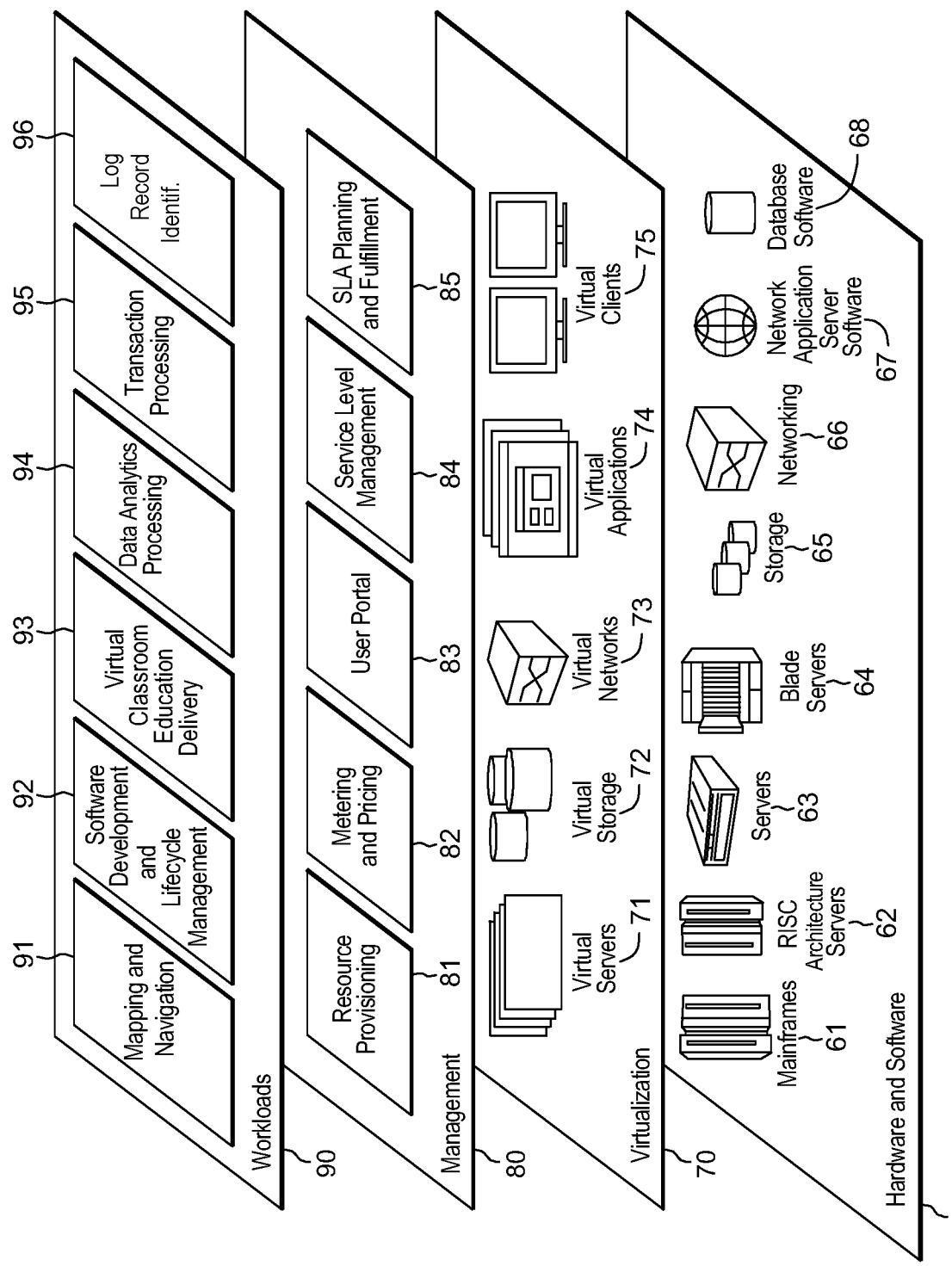
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and log record searching and identification 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
maintaining log files, of a database system, on a plurality of log storage devices of the database system, the log files comprising log records of changes to database objects of a database, wherein a log record of a log file corresponds to an action performed against the database and remains unmodifiable once committed the log file; indexing the log files to obtain a collection of log indexes, wherein the indexing comprises, for each log storage device of the plurality of log storage devices, indexing log records stored on the log storage device to obtain a respective log index of the log records stored on the log storage device, and wherein the collection of log indexes is stored as a collection of distributed tree data structures;
based on a request, identifying two or more log storage devices, of the plurality of log storage devices, that store log records for servicing the request, the two or more log storage devices storing two or more log indexes, of the collection of log indexes, that index an aggregate set of log records on the two or more log storage devices, wherein two or more tree data structures of the collection of distributed tree data structures are identified for servicing the request;
based on identifying the two or more log indexes that store log records for servicing the request, obtaining the two or more log indexes from the two or more log storage devices;
building an aggregated log index from the obtained two or more log indexes based on obtaining the two or more log indexes, the aggregated log index aggregating the two or more log indexes and indexing the aggregate set of log records on the two or more log storage devices, wherein the request identifies a given scope of log records for a response, wherein the aggregate set of log records comprises at least one log record within the given scope of the request and at least one log record outside of the given scope of the request, wherein the aggregated log index indexes both the at least one log record within the given scope of the request and the at least one log record outside of the given scope of the request, and wherein the aggregated log index is a composite tree data structure assembled from the two or more tree data structures identified for servicing the request; and
using the aggregated log index in identifying and locating specific log records, of the aggregate set of log records, for responding to the request, the specific log records being the at least one log record within the given scope of the request, wherein a response to the request identifies the at least one log record within the given scope of the request.

2. The method of claim 1, wherein the database objects include one or more database objects of one or more types selected from the group consisting of: tables, indexes, index spaces, partitions, and data sets of the database, wherein the indexing indexes log records of changes to the one or more database objects, and wherein the using the aggregated log index to identify and locate specific log records for responding to the request searches for a subset of those changes to those one or more database objects.

3. The method of claim 1, wherein the identifying the two or more log storage devices is based on a timeframe of changes considered by the request.

4. The method of claim 1, further comprising storing, on each log storage device of the log storage devices, each respective log index obtained from the indexing the log records stored on the log storage device.

5. The method of claim 1, wherein the indexing the log files indexes the log records of changes on a basis of one type selected from the group consisting of: timing of database changes, objects being changed by the changes, and change types of the changes.

6. The method of claim 5, wherein the collection of log indexes is a first collection of log indexes, wherein the method further comprises:
repeating the indexing on a basis of another type selected from the group consisting of: timing of database changes, objects being changed by the changes, and change types of the changes, wherein repeating the indexing provides a second collection of log indexes, and wherein the second collection of log indexes is made available for selection, based on the request, for servicing the request.

7. The method of claim 1, wherein a given log storage device of the log storage devices maintains two or more log storage files, and wherein, for each log storage file of the two or more log storage files, the indexing produces a respective log index of log records of that log storage file, wherein the respective log indexes for the two or more log storage files are included in the collection of log indexes.

8. The method of claim 1, wherein, for a given log record in a given log file stored on a given log storage device indexed by an index of the collection of indexes, the index identifies the given log storage device, the given log file, and a specific location of the given log record in the given log file.

9. The method of claim 1, wherein the plurality of log storage devices comprise one or more internal hard drives of a computer system and one or more external drives external to the computer system, the one or more external drives selected from the group consisting of: tape drives, and direct-access storage devices.

10. A computer system comprising:
a memory; and
a processor in communication with the memory, wherein the computer system is configured to perform a method comprising:
maintaining log files, of a database system, on a plurality of log storage devices of the database system, the log files comprising log records of changes to database objects of a database, wherein a log record of a log file corresponds to an action performed against the database and remains unmodifiable once committed the log file;
indexing the log files to obtain a collection of log indexes, wherein the indexing comprises, for each log storage device of the plurality of log storage devices, indexing log records stored on the log storage device to obtain a respective log index of the log records stored on the log storage device, and wherein the collection of log indexes is stored as a collection of distributed tree data structures;
based on a request, identifying two or more log storage devices, of the plurality of log storage devices, that store log records for servicing the request, the two or more log storage devices storing two or more log indexes, of the collection of log indexes, that index an aggregate set of log records on the two or more log storage devices, wherein two or more tree data structures of the collection of distributed tree data structures are identified for servicing the request;
based on identifying the two or more log indexes that store log records for servicing the request, obtaining the two or more log indexes from the two or more log storage devices;
building an aggregated log index from the obtained two or more log indexes based on obtaining the two or more log indexes, the aggregated log index aggregating the two or more log indexes and indexing the aggregate set of log records on the two or more log storage devices, wherein the request identifies a given scope of log records for a response, wherein the aggregate set of log records comprises at least one log record within the given scope of the request and at least one log record outside of the given scope of the request, wherein the aggregated log index indexes the at least one log record within the given scope of the request and the at least one log record outside of the given scope of the request, and wherein the aggregated log index is a composite tree data structure assembled from the two or more tree data structures identified for servicing the request; and
using the aggregated log index in identifying and locating specific log records, of the aggregate set of log records, for responding to the request, the specific log records being the at least one log record within the given scope of the request, wherein a response to the request identifies the at least one log record within the given scope of the request.

11. The computer system of claim 10, further comprising storing, on each log storage device of the log storage devices, each respective log index obtained from the indexing the log records stored on the log storage device.

12. The computer system of claim 10, wherein, for a given log record in a given log file stored on a given log storage device indexed by an index of the collection of indexes, the index identifies the given log storage device, the given log file, and a specific location of the given log record in the given log file.

13. A computer program product comprising:
a computer readable storage medium readable by a processing circuit and storing instructions for execution by the processing circuit for performing a method comprising:
maintaining log files, of a database system, on a plurality of log storage devices of the database system, the log files comprising log records of changes to database objects of a database, wherein a log record of a log file corresponds to an action performed against the database and remains unmodifiable once committed the log file;
indexing the log files to obtain a collection of log indexes, wherein the indexing comprises, for each log storage device of the plurality of log storage devices, indexing log records stored on the log storage device to obtain a respective log index of the log records stored on the log storage device, and wherein the collection of log indexes is stored as a collection of distributed tree data structures;
based on a request, identifying two or more log storage devices, of the plurality of log storage devices, that store log records for servicing the request, the two or more log storage devices storing two or more log indexes, of the collection of log indexes, that index an aggregate set of log records on the two or more log storage devices, wherein two or more tree data structures of the collection of distributed tree data structures are identified for servicing the request;

based on identifying the two or more log indexes that store log records for servicing the request, obtaining the two or more log indexes from the two or more log storage devices;

building an aggregated log index from the obtained two or more log indexes based on obtaining the two or more log indexes, the aggregated log index and indexing the aggregate set of log records on the two or more log storage devices, wherein the request identifies a given scope of log records for a response, wherein the aggregate set of log records comprises at least one log record within the given scope of the request and at least one log record outside of the given scope of the request, wherein the aggregated log index indexes the at least one log record within the given scope of the request and the at least one log record outside of the given scope of the request, and wherein the aggregated log index is a composite tree data structure assembled from the two or more tree data structures identified for servicing the request; and using the aggregated log index in identifying and locating specific log records, of the aggregate set of log records, for responding to the request, the specific log records being the at least one log record within the given scope of the request, wherein a response to the request identifies the at least one log record within the given scope of the request.

14. The computer program product of claim 13, wherein, for a given log record in a given log file stored on a given log storage device indexed by an index of the collection of indexes, the index identifies the given log storage device, the given log file, and a specific location of the given log record in the given log file.

\* \* \* \* \*